(12) United States Patent
Walther

(10) Patent No.: US 9,715,523 B2
(45) Date of Patent: Jul. 25, 2017

(54) METHOD AND SYSTEM FOR SELECTING AT LEAST ONE DATA RECORD FROM A RELATIONAL DATABASE

(71) Applicant: Jens Walther, Fronhausen (DE)

(72) Inventor: Jens Walther, Fronhausen (DE)

(73) Assignee: Continental Automotive GmbH, Hannover (DE)

( * ) Notice: Subject to any disclaimer, the term of this patent is extended or adjusted under 35 U.S.C. 154(b) by 493 days.

(21) Appl. No.: 14/362,821

(22) PCT Filed: Dec. 5, 2012

(86) PCT No.: PCT/EP2012/074519
§ 371 (c)(1),
(2) Date: Jun. 4, 2014

(87) PCT Pub. No.: WO2013/083639
PCT Pub. Date: Jun. 13, 2013

(65) Prior Publication Data
US 2014/0324901 A1    Oct. 30, 2014

(30) Foreign Application Priority Data

Dec. 6, 2011    (DE) .......................... 10 2011 087 843

(51) Int. Cl.
G06F 17/30    (2006.01)

(52) U.S. Cl.
CPC .. G06F 17/30386 (2013.01); G06F 17/30023 (2013.01); G06F 17/30395 (2013.01)

(58) Field of Classification Search
None
See application file for complete search history.

(56) References Cited

U.S. PATENT DOCUMENTS

| | | |
|---|---|---|
| 5,548,749 A | 8/1996 | Kroenke et al. |
| 7,257,599 B2 | 8/2007 | Sauermann et al. |

(Continued)

FOREIGN PATENT DOCUMENTS

| | | |
|---|---|---|
| CN | 1797539 | 7/2006 |
| CN | 101296365 | 10/2008 |

(Continued)

OTHER PUBLICATIONS

Masataka Goto et al. et al: "Speech-Recognition Interfaces for Music Information Retrieval: "Speech Completion" and "Speech Spotter"", Proceedings of the 5$^{th}$ International Conference on Music Information Retrieval (ISMIR 2004),, Oct. 2004 (2204-10), pp. 403-408, XP55065523.

*Primary Examiner* — Syed Hasan
(74) *Attorney, Agent, or Firm* — Cozen O'Connor

(57) ABSTRACT

A method for selecting at least one data record from a relational database having a plurality of data records each having at least two attributes each with a type of the attribute and a value of the attribute includes: providing a first subset of data records from the relational database on the basis of a stipulation for the type of a first attribute and independently of a stipulation for the value of the first attribute; selecting data records from the first subset on the basis of a stipulation for a second attribute; providing the selected data records in a second subset; and then selecting the at least one data record from the second subset on the basis of the stipulation for the value for the first attribute.

7 Claims, 1 Drawing Sheet

(56) References Cited

U.S. PATENT DOCUMENTS

| | | | |
|---|---|---|---|
| 2002/0038597 A1* | 4/2002 | Huopaniemi | G06F 17/30743 84/609 |
| 2002/0065658 A1* | 5/2002 | Kanevsky | G06F 17/30902 704/260 |
| 2002/0069059 A1* | 6/2002 | Smith | G10L 15/193 704/257 |
| 2002/0083060 A1* | 6/2002 | Wang | G06F 17/30743 |
| 2002/0088336 A1* | 7/2002 | Stahl | G10H 1/0041 84/609 |
| 2002/0122137 A1* | 9/2002 | Chen | H04N 5/38 348/552 |
| 2004/0128141 A1* | 7/2004 | Murase | G10L 15/22 704/275 |
| 2004/0181391 A1* | 9/2004 | Inoue | G10L 15/063 704/10 |
| 2005/0103187 A1* | 5/2005 | Bodlaender | G06F 17/30056 84/609 |
| 2005/0177346 A1 | 8/2005 | Williams | |
| 2007/0043768 A1* | 2/2007 | Kang | G06F 17/30743 |
| 2007/0050191 A1* | 3/2007 | Weider | G06F 17/30864 704/275 |
| 2007/0167187 A1* | 7/2007 | Rezvani | G10L 15/26 455/550.1 |
| 2007/0222734 A1* | 9/2007 | Tran | G06F 17/30755 345/98 |
| 2008/0154611 A1* | 6/2008 | Evermann | G06F 17/30899 704/275 |
| 2012/0173574 A1* | 7/2012 | Homma | G06F 17/30749 707/772 |

FOREIGN PATENT DOCUMENTS

| | | |
|---|---|---|
| DE | 101 13 515 | 10/2002 |
| DE | 103 31 817 | 2/2005 |
| DE | 10 2005 056 551 | 6/2006 |
| EP | 1 393 206 | 3/2004 |
| GB | 2465383 | 5/2010 |

* cited by examiner

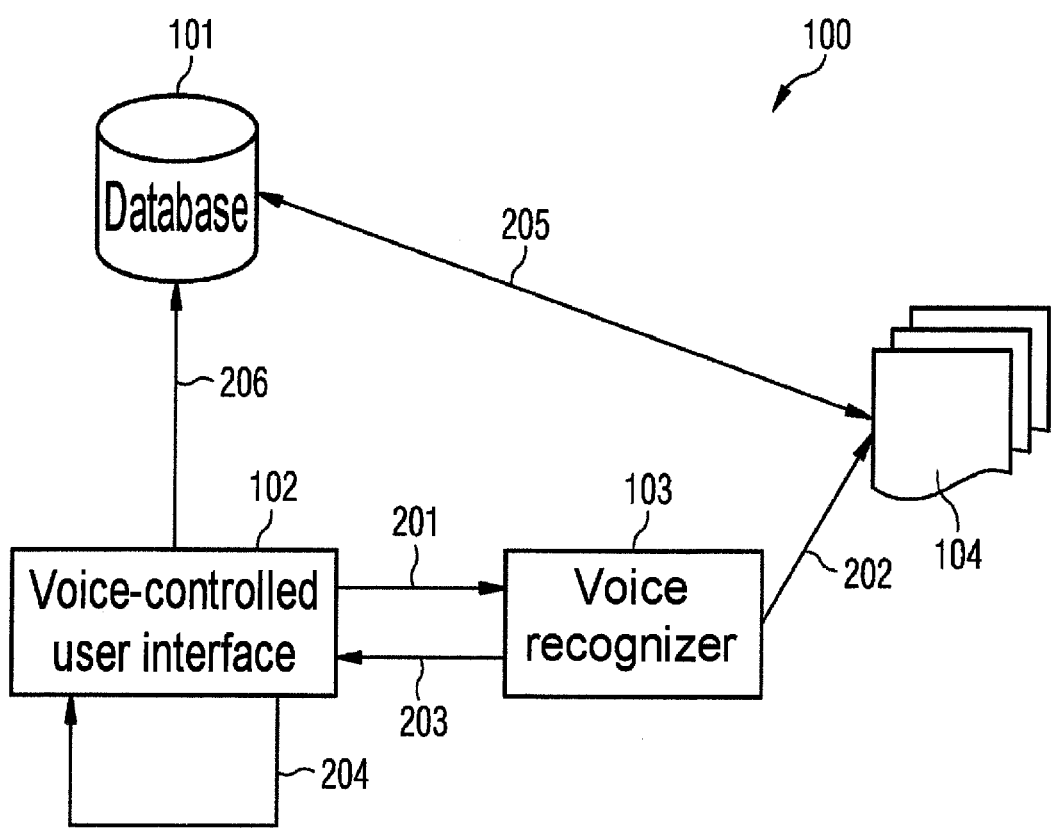

METHOD AND SYSTEM FOR SELECTING AT LEAST ONE DATA RECORD FROM A RELATIONAL DATABASE

CROSS-REFERENCE TO RELATED APPLICATIONS

This is a U.S. national stage of application No. PCT/EP2012/074519, filed on 5 Dec. 2012, which claims priority to the German Application No. 10 2011 087 843.2, filed 6 Dec. 2011, the content of both incorporated herein by reference.

BACKGROUND OF THE INVENTION

1. Field of the Invention

The invention relates to a method for selecting a data record from a relational database, in particular a database comprising pieces of music. The invention also relates to a system for selecting a data record from a relational database, in particular a database comprising pieces of music.

2. Related Art

In motor vehicles, voice control is used to control units of the motor vehicle. For example, it is possible to control a car telephone or a navigation system of the motor vehicle by transmitting spoken commands.

US 2005/0177346 A1 shows a voice recognition method in which recognition hypotheses can be excluded from a hit list on the basis of earlier rejections.

SUMMARY OF THE INVENTION

It is desirable to specify a method and a system for selecting a data record from a relational database, which enables reliable and convenient operation.

The invention is characterized by a method and a corresponding system for selecting a data record from a relational database having a plurality of data records.

The data records each have at least two attributes. The attributes each have a type and a value. For example, in the case of pieces of music, the type of the attribute is the type "genre" and the associated value is the value "pop". For example, in the case of pieces of music, the type of the attribute is the type "album" and the associated value is the value "The Art of Silence".

According to one embodiment of the invention, a first subset of data records is selected from the relational database on the basis of a stipulation for the type of the first attribute and independently of the stipulation for the value of the first attribute. Data records are selected from the first subset on the basis of a stipulation for the second attribute. The selected data records are provided in a second subset. Data records are then selected from the second subset on the basis of the stipulation for the value for the first attribute.

According to embodiments of the invention, the stipulation for the first attribute is effected using a first voice input containing the stipulation for the first attribute of the data record. The first stipulation is received.

Alternatively or additionally, according to embodiments of the invention, the stipulation for the second attribute is effected using a second voice input containing the stipulation for the second attribute of the data record. The second stipulation is received.

According to further embodiments of the invention, the first stipulation is effected, in particular, in the form of a haptic input, for example using a graphical user interface.

For example, the first input comprises the genre as the type and pop as the value as the stipulation for the first attribute. Other values for the type "genre" are, for example, rock, classical or audio book. Another type for the first attribute comprises, for example, the year or a different type.

The first subset is provided on the basis of the stipulated type for the first attribute and comprises all genres, for example. The stipulation for the desired genre, for example pop, is not taken into account in this case. The second input, in particular in the form of a voice input, then comprises the album "Sound of Silence" as the stipulation for the second attribute, for example. Those data records which are associated with the album "Sound of Silence" are selected from the first subset comprising data records containing different associated values for the genre. The data records which are selected from the first subset and are associated with the album "Sound of Silence" are provided in a second subset. The second subset comprises, in particular, data records containing the stipulated value "pop" for the attribute "genre" and also comprises data records containing a different value for the attribute "genre", for example data records containing the value "rock" for the genre attribute.

Those data records that correspond to the stipulated value for the first attribute, that is to say those data records associated with the genre "pop" for example, are then selected from the second subset. Those data records which are associated with a value other than the stipulated value are deleted from the selection.

Fast, reliable and convenient voice control for selecting one or more data records from a database is therefore possible even if the database comprises a large number of data records, for example more than 17,000 data records.

According to embodiments of the invention, the relational database comprises a plurality of pieces of music having so-called metadata as attributes. The metadata comprise, in particular, the title, artist, album, year and/or genre of the respective piece of music. For example, the metadata are divided into two groups depending on the frequency with which they occur in the database. Metadata occurring frequently in the database and are therefore associated with a large number of pieces of music in the database as an attribute, for example year or genre, are also referred to as a general metadata item. Metadata associated with pieces of music less often in the database, for example title, artist or album, are also referred to as specific metadata.

In order to select a piece of music from the relational database comprising, for example, a number of more than 15,000 data records, the user stipulates a genre, for example, using the first voice input. For example, the first stipulation is the genre "pop" as the first attribute of the at least one data record to be selected. As the second stipulation, the user stipulates a specific metadata item, for example an album, using the second voice input, for example. The user stipulates the second attribute, for example. In particular, the stipulation for the first attribute is effected before the stipulation for the second attribute in terms of time. In particular, the stipulation for the general metadata item will be effected first and the stipulation for the specific metadata item will then be effected.

The relational database which stores, for example, more than 15,000 data records stores, for example, 10,000 data records which have been associated with the genre "pop" as the attribute. The database stores, for example, 11 data records which have been associated with the attribute "Sound of Silence" as the album. In the method according to the invention, the data records are first of all selected from the database and provided as a first subset independently of the respectively associated value for the first attribute. Those data records that correspond to the second, more specific attribute "Sound of Silence" are then selected from the first subset. During this selection and provision, the stipulation for the value for the first attribute is not taken into account and the data records are provided independently of the stipulation for the value for the first attribute. Those data records which also comply with the stipulation for the value for the first attribute, that is to say have also been associated with the genre "pop" as the attribute for example, are then selected from the second subset. Data records which have been associated with a musical style other than pop, for example rock, for the first attribute "genre" are removed from the second subset.

As a result of the fact that the second subset is provided on the basis of the more specific stipulation or the more specific attribute and the stipulation for the value for the first attribute is only then taken into account, it is possible to select the desired data records in a fast and convenient manner. In particular, it is easily possible to select from a large number of data records of more than 15,000 data records, for example. It is therefore possible to use cost-effective hardware for the system.

The system is part of a motor vehicle, in particular. The method and the system make it possible for the user of the motor vehicle to reliably and conveniently select pieces of music from a database containing several thousand music titles by voice control.

BRIEF DESCRIPTION OF THE DRAWING

Further advantages, features and developments emerge from the following example explained in conjunction with the FIGURE.

The single FIGURE schematically shows a system for operating voice control according to one embodiment.

DETAILED DESCRIPTION OF THE
PRESENTLY PREFERRED EMBODIMENTS

A system 100 comprises a database 101. The database 101 is a relational database and comprises a plurality of data records. In particular, the database comprises music titles, for example in MP3 format. The music titles are stored, for example, in a non-volatile memory of a motor vehicle. According to further embodiments, the music titles are stored on a mobile terminal, for example a smart phone or a USB stick, which can be coupled to the motor vehicle.

The music titles in the database 101 can be played back using an audio system of the motor vehicle.

The system 100 has a user interface 102 which is coupled to a voice recognizer 103. Voice control for selecting one or more pieces of music from the database 101 is possible using the user interface 102 with the voice recognizer 103. In particular, a piece of music is selected for playback.

When the system is started, a complete list 104 containing all data records from the database 101 is transmitted to the voice recognizer 103. In particular, a plurality of lists 104, one list in each case for a type of an attribute of the data records in the database 101, are transmitted. For example, one of the lists 104 contains all titles of the pieces of music in the database 101. A further list of the lists 104 contains all albums for the pieces of music in the database 101. A further list contains all artists for the pieces of music in the database 101. A further list contains, for example, all years of the pieces of music in the database 101. A further list of the lists 104 contains, for example, all genres of the pieces of music in the database 101. The list of genres comprises, as values, the genres "pop", "rock" and "classical", for example, and/or further values. The lists are each subsets of data records from the database 101.

In order to select a piece of music from the database or a plurality of pieces of music from the database by voice, the user stipulates a desired genre, for example. The voice recognizer 103 recognizes which type of attribute has been stipulated by the user without taking into account the value of the attribute at this time. For example, the voice recognizer determines that the user has stipulated a stipulation for the genre of the desired pieces of music. The list containing the pieces of music of all genres in the database 101 is therefore selected from the lists 104.

The second stipulation by voice by the user comprises, for example, a stipulation for the title of the desired piece of music. The voice recognizer 103 selects a stipulated number of pieces of music which best correspond to the stipulated title from the list containing the pieces of music of all genres. The selected pieces of music are provided in a further sub-list. This is effected independently of the stipulated value for the genre. The voice recognizer 103 transmits the determined pieces of music to the user interface 102. These are also referred to as result hypotheses.

For example, the voice recognizer 103 provides at least five, in particular more than ten, result hypotheses. According to embodiments, the voice recognizer 103 provides more than 20 data records for the user interface 102, in particular more than 30 data records and at most 50 data records.

From the pieces of music which have been provided by the voice recognizer 103, the user interface 102 selects those which have been associated with the stipulated genre. For example, the pieces of music which have been associated with pop as the genre are selected and are made available to the user as the result. Those pieces of music that have been associated with a genre other than the stipulated genre, that is to say for example a genre other than pop, for example rock or classical, are removed by the user interface 102 from the subset provided by the voice recognizer 103.

According to embodiments, a maximum number of data records intended to be made available to the user as the result is stipulated. For example, at least 5 and at most 7 pieces of music which best correspond to the user's selection and, with the voice stipulations, have the greatest degree of correlation with respect to the data records in the database 101 are intended to be displayed to the user. According to further embodiments, a different value is stipulated for the maximum value of result data records, for example at most 10 pieces of music. According to further embodiments, a lower limit is not stipulated, with the result that a number of 0 data records is also possible.

The FIGURE schematically illustrates method steps by arrows. Step 201 symbolizes voice recognition. Step 202 symbolizes hypothesis formation and step 203 symbolizes the provision of the data records selected from the list 104 as the second subset. Step 204 symbolizes the comparison of the second subset with the stipulation for the value for the first attribute. Step 205 symbolizes the filling of the lists 104 when the system is started. In step 206, the data records selected after step 204 are retrieved from the database and are played back using the audio system of the motor vehicle, for example.

As a result of the fact that the voice recognizer 103 always operates with one of the lists, each having all values of an attribute, without a selection of subsets being transmitted to the voice recognizer, it is possible to select large subsets from the data records in the database 101 by voice. In addition, the set of results is provided quickly without unnaturally long latencies occurring. The method makes it possible to select data records from large subsets without long latencies being produced.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for selecting and playing back on an audio system of a motor vehicle at least one data record from a relational database (101) having a plurality of data records each data record being a piece of music having associated therewith at least first and second attributes each attribute having an attribute type and an attribute value, the method comprising:
   receiving a first input as a voice input with a stipulation for the attribute type of the first attribute of the at least one data record to be selected and a stipulation of the attribute value of the first attribute;
   receiving a second input as a voice input with a stipulation for the attribute value of the second attribute of the at least one data record to be selected;
   providing a first subset (104) of data records from the relational database (101) on the basis of the received stipulation for the attribute type of a first attribute, the first subset (104) being provided without regard to the received attribute value of the first attribute;
   selecting data records from the first subset (104) on the basis of the received stipulation for the attribute value of the second attribute;
   providing the selected data records in a second subset; then
   selecting the at least one data record from the second subset on the basis of the stipulation for the attribute value for the first attribute; and then
   playing back, on the audio system of the motor vehicle, the selected at least one data record.

2. The method as claimed in claim 1, wherein the first input is received before receiving the second input.

3. The method as claimed in claim 1, wherein:
   the stipulation for the first attribute by the first voice input is a general metadata item for pieces of music selected from the group consisting of a year and a genre for a piece of music; and
   the stipulation for the second attribute by the second voice input is a specific metadata item for pieces of music selected from the group consisting of a title, an artist and an album for a piece of music.

4. The method as claimed in claim 3, further comprising:
   selecting a plurality of data records from the second subset on the basis of the stipulation for the attribute value for the first attribute, a maximum value being stipulated for the number of data records to be selected; and
   providing the second subset on the basis of the stipulated maximum value.

5. The method as claimed in claim 4, wherein the second subset comprises at least 20 data records.

6. A system for selecting and playing back on an audio system of a motor vehicle a data record from a relational database having a plurality of data records each data record being a piece of music having associated therewith at least first and second attributes each attribute having an attribute type and an attribute value, the system being configured to:
   receive a first input as a voice input with a stipulation for the attribute type of the first attribute of the at least one data record to be selected and a stipulation of the attribute value of the first attribute;
   receive a second input as a voice input with a stipulation for the attribute value of the second attribute of the at least one data record to be selected;
   provide a first subset (104) of data records from the relational database (101) on the basis of the received stipulation for the attribute type of a first attribute, the first subset (104) being provided without regard to the received attribute value of the first attribute;
   select data records from the first subset (104) on the basis of the received stipulation for the attribute value of the second attribute;
   provide the selected data records in a second subset; then
   select the at least one data record from the second subset on the basis of the stipulation for the attribute value for the first attribute; and then
   play back, on the audio system of the motor vehicle, the selected at least one data record.

7. The method as claimed in claim 5, wherein the second subset comprises more than 30 data records.

* * * * *